United States Patent [19]

Conrady et al.

[11] Patent Number: 5,670,860
[45] Date of Patent: Sep. 23, 1997

[54] HIGH POWER, HIGH FREQUENCY, LIQUID-COOLED TRANSMISSION CABLE AND CHARGING SYSTEM

[75] Inventors: Clint Conrady; George R. Woody, both of Redondo Beach; Juventino Rosas, Los Angeles; Victor O. Asbury, Costa Mesa; Sergio Ramos, Wilmington; Eddie Yeow, San Gabriel, all of Calif.

[73] Assignee: Hughes Electronics, Los Angeles, Calif.

[21] Appl. No.: 467,423

[22] Filed: Jun. 6, 1995

[51] Int. Cl.⁶ .................... H02J 7/00; H01B 7/34; H01B 9/06
[52] U.S. Cl. .................................. 320/2; 174/15.6
[58] Field of Search .................... 320/2; 174/15.1, 174/17 LF, 15.4, 15.6, 11 R, 31 R, 29; 165/104.25; 505/885, 886

[56] References Cited

U.S. PATENT DOCUMENTS

| | | | |
|---|---|---|---|
| 3,686,422 | 8/1972 | Doose | 174/15.4 X |
| 3,835,240 | 9/1974 | Matthäus | 174/15.6 |
| 3,946,142 | 3/1976 | Kellow et al. | 174/15.6 |
| 3,949,154 | 4/1976 | Rasquin | 174/15.6 |
| 3,962,529 | 6/1976 | Kubo | 174/15.6 |
| 4,215,234 | 7/1980 | Hayashi et al. | 174/15.6 |
| 4,947,007 | 8/1990 | Dew et al. | 174/15.4 X |
| 5,157,319 | 10/1992 | Klontz et al. | 320/2 |
| 5,412,304 | 5/1995 | Abbott | 320/2 |

Primary Examiner—Peter S. Wong
Assistant Examiner—Patrick B. Law
Attorney, Agent, or Firm—Leonard A. Alkov; Wanda K. Denson-Low

[57] ABSTRACT

A charging system employing a liquid-cooled transmission cable for transferring power. The transmission cable has a central tube with an extruded member disposed therewithin for carrying coolant. A plurality of layers of coaxial tubular wire braid are disposed around the central tube that carry charging current and that are separated by a layers of dielectric material. An outer layer of wire braid is disposed around an outermost layer of dielectric material that is used for grounding and/or shielding. An outer jacket is disposed around the outer layer of wire braid for encasing the transmission cable. The extruded member may comprise a thermoplastic rubber extrusion, for example. The coolant path through the transmission cable is internally supported by means of the extruded member to assure uniform flexibility, maintain tangential magnetic flux, and eliminate kinking and collapse of the flow path. The transmission cable is designed for charging propulsion batteries of an electric vehicle at extremely high charge rates. The charging system includes an external power source and off-vehicle inverter for providing charging current to the propulsion batteries by way of a charge port and a rectification/filter circuit in the electric vehicle. The transmission cable is coupled between the charge port and the rectification/filter circuit. A cooling system is coupled to the transmission cable that has a radiator for cooling coolant, a manifold, a pump that pumps the coolant, and a reservoir for storing excess coolant. The coolant is pumped from the cooling system through the transmission cable to cool it. The transmission cable 20 is capable of transferring 120 kW @334 Amps RMS @75 KHz.

6 Claims, 1 Drawing Sheet

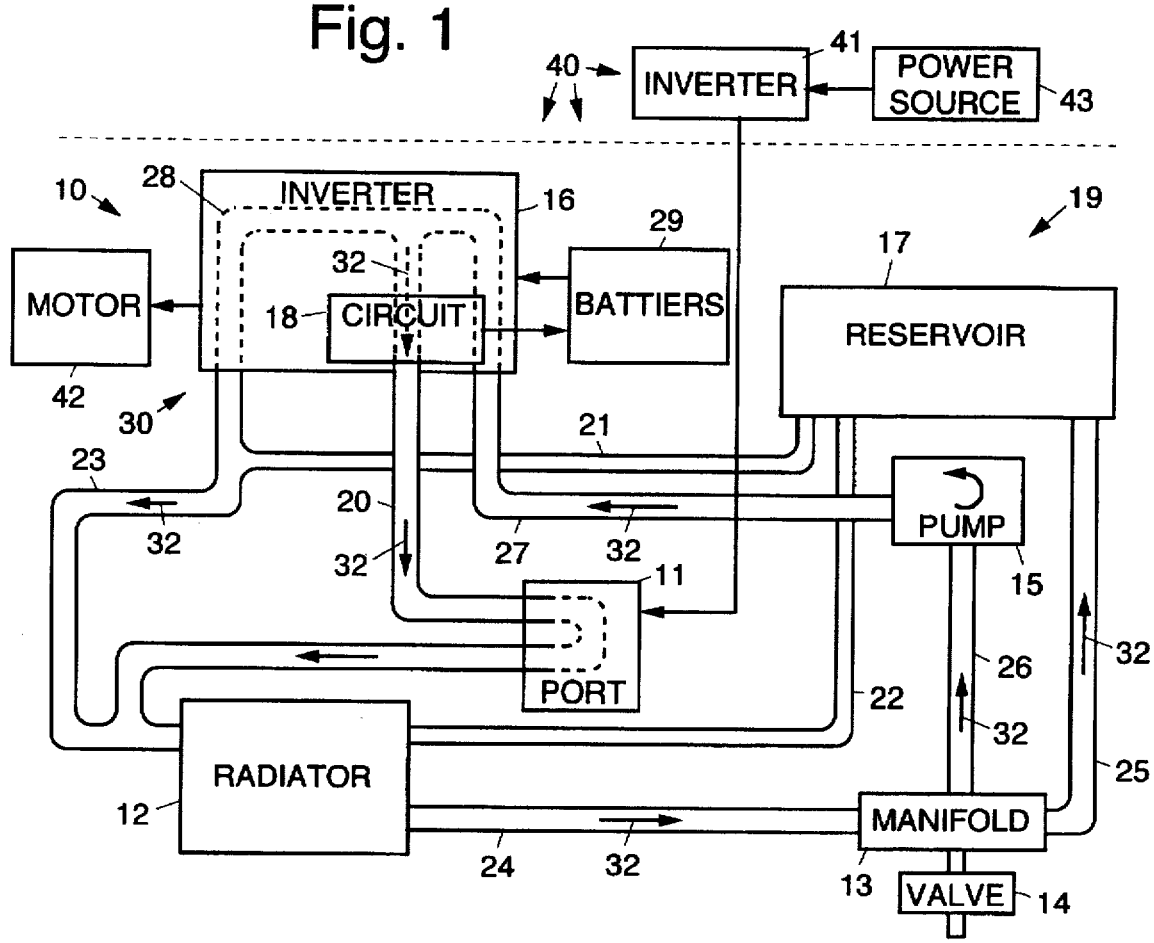
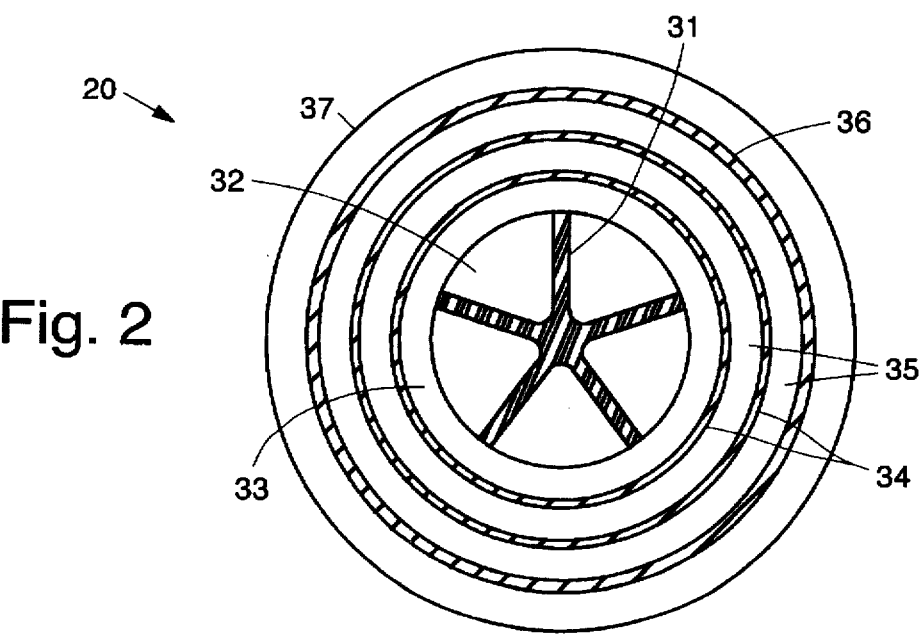

HIGH POWER, HIGH FREQUENCY, LIQUID-COOLED TRANSMISSION CABLE AND CHARGING SYSTEM

BACKGROUND

The present invention relates generally to electric vehicle charging systems, and more particularly, to a high power handling capacity, high frequency, liquid-cooled transmission cable and electric vehicle charging and cooling systems employing same.

The assignee of the present invention designs and develops inductive chargers for use with electric vehicles, and the like. Inductive chargers operate at very high charge rates and therefore generate a great deal of heat that must be carried by power transmission cables that charge the electric vehicle.

The transmission cable is a medium by which electric power is transferred during charging of propulsion batteries of electric vehicles, for example. Previous transmission cable designs developed by the assignee of the present invention and others for charging electric vehicle batteries, and the like, have relied on increased conductor area to transfer high power which results in a heavy, bulky transmission cable. Other transmission cables, developed by the assignee of the present invention, for example, that utilize axial cooling have not incorporated an internal structure to reduce kinking and minimize the possibility of restricted flow paths.

In addition, wide copper bus bars have been used to transfer high power at high frequencies and charge rates. A large surface area is needed for AC power at high frequencies due to skin effects. This results in large, heavy bus bars that are not practical for some applications, and in particular electric vehicle applications.

Accordingly, it is an objective of the present invention to provide for a high power handling capacity, high frequency, liquid-cooled transmission cable that eliminates the above-mentioned problems, and that may be used with electric vehicle charging systems, and the like, and improved and electric vehicle charging and cooling systems employing the transmission cable.

SUMMARY OF THE INVENTION

To meet the above and other objectives, the present invention provides for an improved liquid-cooled transmission cable for transferring power in an electric vehicle charging system. The transmission cable that is not heavy or bulky, and that does not kink or restrict coolant flow paths. The present invention also provides for an improved and electric vehicle charging system employing the transmission cable.

More specifically, the transmission cable comprises a central tube that is used to carry coolant having an extruded member disposed therewithin. A plurality of layers of coaxial tubular wire braid are disposed around the central tube that carry charging current and that are separated by a layers of dielectric material. An outer layer of wire braid is disposed around an outermost layer of dielectric material that is used for grounding and/or shielding. An outer jacket is disposed around the outer layer of wire braid for encasing the cable. The extruded member may comprise a thermoplastic rubber extrusion that may have a cross section in the shape of a five-pointed star.

The design of the transmission cable is such that its overall size is minimized while relatively low temperatures are maintained throughout the cable during charging. The transmission cable uses a central coolant path to reduce the overall cable temperature. This coolant path is internally supported by means of the extruded member to assure uniform flexibility, maintain tangential magnetic flux, and eliminate kinking and collapse of the flow path.

The transmission cable is designed for use as part of the charging system of an electric vehicle that has a charge port disposed thereon. The charging system has an off-vehicle inverter that is operated at extremely high charging rates for providing high frequency charging current by way of a rectification/filter circuit to charge propulsion batteries of the electric vehicle. The transmission cable is coupled between the rectification/filter circuit and the charge port. A cooling system is coupled to the charging system and the transmission cable that comprises a radiator for cooling coolant, a manifold coupled to an output of the radiator, a pump coupled to the manifold that forces coolant through the cooling system, and a reservoir coupled to the manifold and the radiator for storing excess coolant. Coolant is pumped from the cooling system through the transmission cable. The transmission cable was specifically designed to transfer up to 120 kW @334 Amps RMS @75 KHz, but it may easily be modified to accommodate higher and lower charging powers.

Charging power is transferred through concentric layers of tubular wire braid that are cooled by coolant flowing through a coolant path at the center of the cable. Without such active cooling, the cable would be excessively large and heavy. The existence of the coolant path in the center of the cable increases the risk of kinking of the cable which could restrict the coolant path during operation. The design of the present cable incorporates the flexible extruded member inside the coolant flow path to reduce this risk.

The transmission cable was developed for specific use with electric vehicle charging systems for electric vehicles that are developed by the assignee of the present invention. For this type of application, it is useful to transfer high power, high frequency alternating current through a small, simple, lightweight cable from the charge port to the rectification/filter circuit. The transmission cable is specifically designed to fulfill this need, but may be used for many other applications requiring the transfer of high power levels.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 shows an embodiment of an electric vehicle charge port cooling system employing a liquid-cooled transmission cable in accordance with the principles of the present invention;

FIG. 2 illustrates a cross-sectional view of a liquid-cooled transmission cable in accordance with the present invention employed with the cooling system of FIG. 1.

DETAILED DESCRIPTION

Referring to the drawing figures, FIG. 1 shows an electric vehicle charging system 40, a motor drive propulsion system 30, and a cooling system 10 employing a liquid-cooled transmission cable 20 in accordance with the principles of the present invention. FIG. 1 is representative of one of many possible applications of the transmission cable 20 of the present invention. Coolant 32, such as a 50/50 ethylene glycol and water solution may be used with the cooling system 10 and cable 20.

The electric vehicle charging system 40 is comprised of a power source 43 coupled to an external inverter 41 disposed off of a vehicle 19 (depicted above the horizontal dashed line in FIG. 1) and components disposed on the electric vehicle 19 (depicted below the horizontal dashed line). The external inverter 41 is coupled to a charge port 11 disposed on the electric vehicle 19. The charge port 11 is coupled to a rectification/filter circuit 18 by way of the transmission cable 20. The rectification/filter circuit 18 is coupled to propulsion batteries 29 of the vehicle. High frequency charging current at on the order of 334 Amps RMS @75 KHz is supplied by the off-vehicle external inverter 41 which is transferred to the propulsion batteries 29 by way of the charge port 11, transmission cable 20, and rectification/filter circuit 18. The charge port 11 inductively couples power from the external inverter 41 to the propulsion batteries 29 of the electric vehicle 19 by way of the transmission cable 20 and the rectification/filter circuit 18.

The motor drive propulsion system 30 comprises an on-vehicle inverter 16 that is coupled between the propulsion batteries 29 and an electric motor 42 of the vehicle 19. The on-vehicle inverter 16 processed DC power derived from the propulsion batteries 29 and inverts it to supply 18 KHz AC motor drive power to the electric motor 42 of the vehicle 19.

The cooling system 10 is operative to cool the on-vehicle inverter 16, rectification/filter circuit 18, and the transmission cable 20. The cooling system 10 is comprised of a radiator 12 that is coupled to a manifold 13 by way of a coolant hose 24. The manifold 13 also has a drain valve 14. Outputs of the manifold 13 are coupled by way of a coolant hose 26 to a pump 15 that pumps coolant 32 through a coolant hose 27 to the on-vehicle inverter 16 and back to the radiator 12 by way of a coolant hose 23. The rectification/falter circuit 18 is physically disposed adjacent to the on-vehicle inverter 16 and is cooled by coolant lines 28 passing through the inverter 16. Another output of the manifold is coupled by way of a vent hose 25 to a reservoir 17. In addition, vent hoses 21, 22 are coupled from the coolant hose 23 linking the on-vehicle inverter 16 and the radiator 12 to the reservoir 17, and from the radiator 12 directly to the reservoir 17. Coolant 32 is tapped off of the coolant lines 28 passing through the on-vehicle inverter 16 to cool the rectification/filter circuit 18 and to supply coolant 32 for the transmission cable 20.

In operation, coolant 32 is pumped by the pump 15 out of the radiator 12 and through the manifold 13 to the on-vehicle inverter 16. Coolant 32 is coupled to the transmission cable 20 by way of the coolant lines 28 used to cool the rectification/filter circuit 18 and is pumped through the transmission cable 20 and the charge port 11 to the radiator 12. Coolant 32 is also pumped through the inverter 16 to the radiator 12. Excess coolant 32 is vented to the reservoir 17 from the radiator 12 and the supply hose 23 to the radiator 12 and from the manifold 13 by way of the vent hoses 21, 22, 25.

FIG. 2 illustrates a cross-sectional view of the transmission cable 20 in accordance with the present invention. The transmission cable 20 is comprised of several layers of coaxial tubular wire braid 34 which are used for power transmission along with an additional outer layer (or layers) of wire braid 36 that is used for grounding and/or shielding.

These layers of wire braid 34 are separated from each other by layers of dielectric material 35. Dielectric materials are chosen that provide sufficient high frequency dielectric strength while minimizing thermal resistance to coolant that is pumped through the transmission cable 20. The innermost tubular wire braid 34 is wrapped around a central tube 33 that is used to carry coolant 32. Inside the central tube 33 is an extruded member 31 that is used to support the tube 33 and keep it from kinking which also maintains tangential magnetic flux. This extruded member 31 is designed to restrict the flow path for the coolant 32 as little as possible and allow for maximum contact between the coolant and an internal wall of the tube 33. For this specific design, and in a reduced-to-practice embodiment of the present invention, a thermoplastic rubber extrusion in the form of a five-pointed star is used as the extruded member 31. An outer jacket 37 is provided to electrically seal and encase the cable 20.

Several samples of the transmission cable 20 described herein have been built and tested. Laboratory tests of the transmission cable 20 have been used to transfer 334 Amps RMS @75 KHz and test measurements indicate that a maximum conductor temperature below 105° C. and a maximum touch temperature (the temperature of the transmission cable 20 that is felt by a user) under 70° C. have been achieved using the transmission cable 20. This testing was done in 25° C. ambient air temperature with 2.1 gallon per minute of coolant 32 comprising a 50/50 ethylene glycol and water solution at 35° C. Extensive testing has also been done on a demonstration high power charging system 30. At 120 kW @334 Amps @75 KHz, the transmission cable 20 was satisfactorily cool during continuous operation. In addition, the transmission cable 20 was flexible and did not kink or have significant flow restrictions.

Thus, high power handling capacity, high frequency, liquid-cooled transmission cable and electric vehicle charging and cooling systems employing same have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A charging system for an electric vehicle, said system comprising:

a power source for supplying power;

an off-vehicle inverter for providing charging current that is used to charge propulsion batteries of the electric vehicle;

a charge port disposed on the electric vehicle that is coupled to the off-vehicle inverter;

a liquid-cooled transmission cable coupled between the charge port and the propulsion batteries of the electric vehicle, that comprises a central tube that is used to carry coolant;

an extruded member disposed within the central tube;

a plurality of layers of coaxial tubular wire braid disposed around the central tube that are used to carry charging current and that each layer thereof is separated by a layer of dielectric material;

an outer layer of wire braid disposed around an outermost layer of dielectric material that is used for grounding and shielding; and an outer jacket disposed around the outer layer of wire braid;

a cooling system coupled to the transmission cable for pumping coolant therethrough to cool the transmission cable, that comprises:
a radiator for cooling coolant;
a manifold coupled to an output of radiator;
a pump coupled to the manifold that pumps coolant through the cooling system; and
a reservoir coupled to the manifold and the radiator for storing excess coolant.

2. The charging system of claim 1 wherein the extruded member comprises a thermoplastic robber extrusion.

3. The charging system of claim 1 wherein the extruded member comprises a thermoplastic robber extrusion in the form of a five-pointed star.

4. A transmission cable comprising:
a central tube that is used to carry coolant;
an extruded member disposed within the central tube;
a plurality of layers of coaxial tubular wire braid disposed around the central tube that are used to carry charging current and that each layer thereof is separated by a layer of dielectric material;
an outer layer of wire braid disposed around an outermost layer of dielectric material that is used for grounding and shielding; and
an outer jacket disposed around the outer layer of wire braid.

5. The transmission cable of claim 1 wherein the extruded member comprises a thermoplastic rubber extrusion.

6. The transmission cable of claim 1 wherein the extruded member comprises a thermoplastic rubber extrusion in the form of a five-pointed star.

* * * * *